United States Patent [19]

Mazziotti

[11] Patent Number: 5,626,520
[45] Date of Patent: May 6, 1997

[54] REVERSIBLE UNIVERSAL JOINT SEAL

[75] Inventor: Philip J. Mazziotti, Toledo, Ohio

[73] Assignee: The Zeller Corporation, Defiance, Ohio

[21] Appl. No.: 490,542

[22] Filed: Jun. 14, 1995

[51] Int. Cl.$^6$ .................................................. F16D 3/41
[52] U.S. Cl. ........................... 464/131; 277/95; 277/210
[58] Field of Search .................................. 464/131, 128, 464/136, 11, 14; 277/209, 210, 208, 95, 38

[56] References Cited

U.S. PATENT DOCUMENTS

| | | | |
|---|---|---|---|
| 2,027,078 | 1/1936 | Warner | 464/131 X |
| 2,841,429 | 7/1958 | McCuistion | 277/209 |
| 3,788,100 | 1/1974 | Pitner | 464/11 |
| 3,906,746 | 9/1975 | Haines | 464/131 |
| 4,530,675 | 7/1985 | Mazziotti | 464/131 |
| 4,572,515 | 2/1986 | Grazioli | 277/209 X |
| 4,874,349 | 10/1989 | Gall | 464/131 X |
| 5,342,240 | 8/1994 | Mazziotti | 464/11 |
| 5,407,387 | 4/1995 | Mazziotti et al. | 464/131 |

FOREIGN PATENT DOCUMENTS

| | | | |
|---|---|---|---|
| 4243417 | 3/1994 | Germany | 277/210 |
| 1213022 | 11/1970 | United Kingdom | 464/131 |

*Primary Examiner*—Daniel P. Stodola
*Assistant Examiner*—William A. Rivera
*Attorney, Agent, or Firm*—Allen D. Gutchess, Jr.

[57] ABSTRACT

A universal joint seal is symmetrical about a transverse plane taken centrally therethrough. In this manner, the seal can be properly and correctly inserted into a bearing cup from either end. This eliminates the requirement for sorting for orientation of the seals after they are made. Either a mechanical sorter is eliminated or an operator for sorting the seals is eliminated.

1 Claim, 3 Drawing Sheets

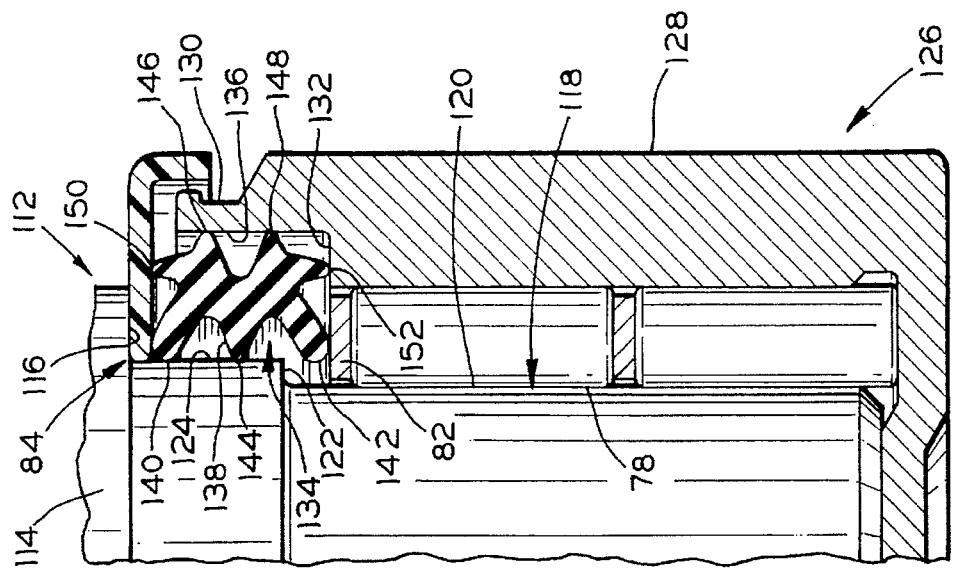
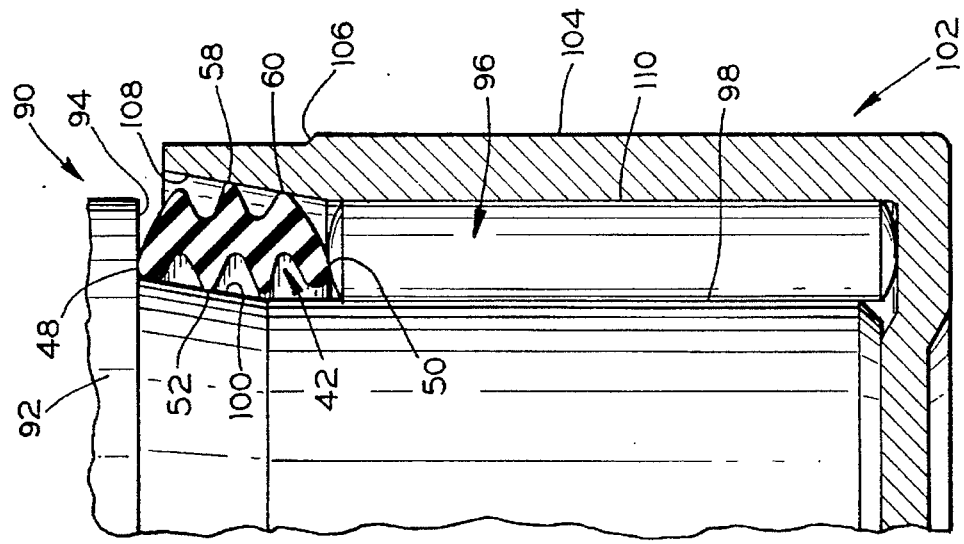
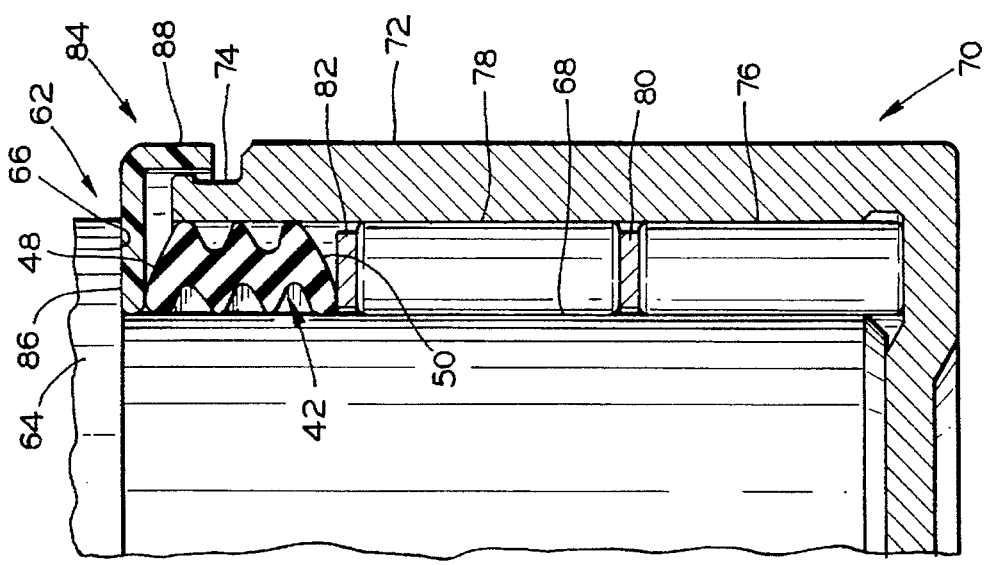

REVERSIBLE UNIVERSAL JOINT SEAL

This invention relates to a reversible seal designed particularly for universal joints having trunnions and bearing cups.

A number of seals for use between cross trunnions and bearing cups of universal joints are known in the art. More specifically, internal universal joint seals having multiple lips to provide more effective seals have been disclosed before in my U.S. Pat. Nos. 4,515,574, issued May 7, 1985; 4,530,675, issued Jul. 23, 1985; and 4,861,315, issued Aug. 29, 1989.

The seal in accordance with the invention is particularly designed for small universal joints but can also be used for larger ones. The new reversible seal is contained between a trunnion of the universal joint cross body and an inner cylindrical surface of the bearing cup. It is also contained between the tops of needle bearings in the cup or a shoulder in the cup and also a shoulder on the body of the cross. The seal has first lips which engage the trunnion of the bearing cross adjacent the shoulder and lips which are staggered with respect to the first ones and which engage the cylindrical surface of the bearing cup near the open end thereof. The seal also has a downwardly-extending lip which engages the tops of the needle bearings and an upwardly-extending lip which engages the shoulder of the cross body. The open end of the bearing cup extends upwardly near the shoulder of the cross body to help provide a contained space for the seal.

Heretofore, when the seals were made, they had to be sorted either mechanically or by an operator, so as to be properly positioned when they are assembled with the bearing cups.

The reversible seal in accordance with the invention can be inserted in the bearing cups from either end of the seal and, therefore, the sorting operation is completely eliminated. Further, the seal cannot be incorrectly assembled with the cup.

It is, therefore, a principal object of the invention to provide a reversible seal for a universal joint, to be located between the bearing cup and the cross trunnion, which can be inserted in the cup from either end of the seal.

Many other objects and advantages of the invention will be apparent from the following detailed description of preferred embodiments thereof, reference being made to the accompanying drawings, in which:

FIG. 3 is a fragmentary view in cross section of a universal joint cross, bearing cup, the universal joint seal, and a plastic shield;

FIG. 4 is a fragmentary view similar to FIG. 3 showing a modified trunnion, modified cup, and the same seal as in FIGS. 2 and 3;

FIG. 5 is a view similar to FIG. 3 but showing a different cup design with a shoulder and a different seal;

Figure 1:
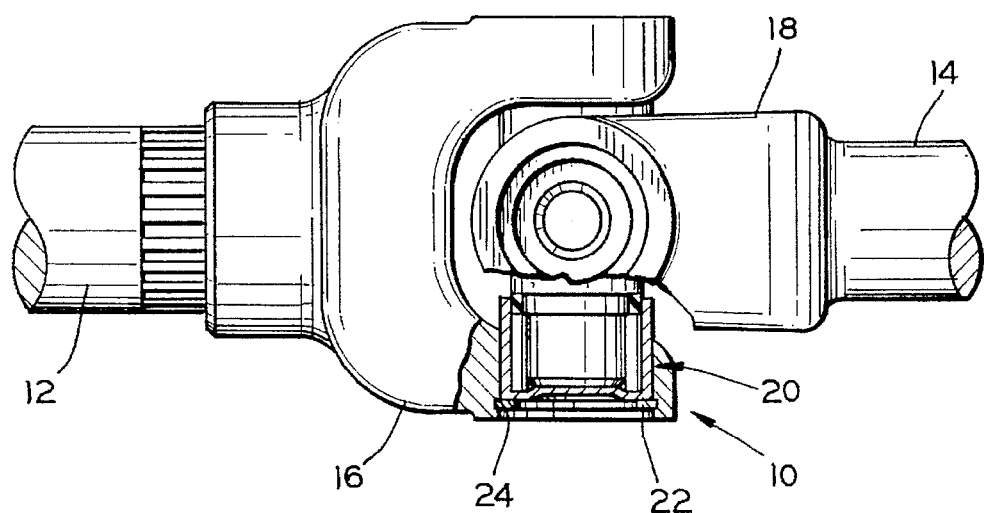
FIG. 1 is a view in elevation, with parts broken away and with parts in cross section, of an assembled universal joint connecting two shafts and embodying the invention.

Referring to FIG. 1, a universal joint embodying the invention is indicated at 10 and connects shafts 12 and 14. The universal joint and shafts can be used in many applications, cars and trucks, for example.

The universal joint 10 includes two yokes 16 and 18 disposed at mutually-perpendicular angles with bearing cups 20 held in arms of the yokes by suitable means, such as a retaining ring 22 which is held in a groove 24 in the yoke arm, as is known in the art.

Figure 2:
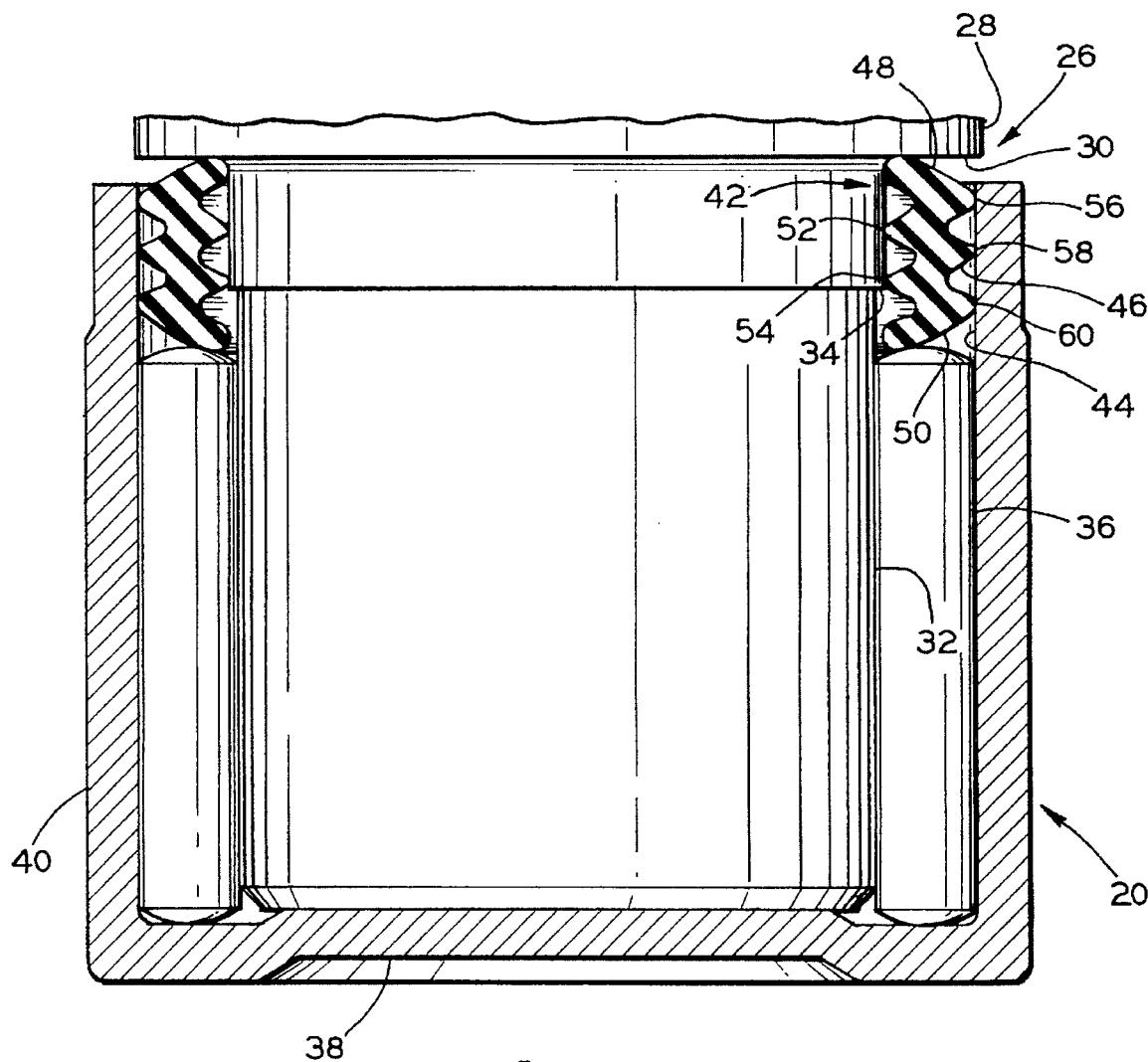
FIG. 2 is a greatly enlarged, fragmentary view in cross section of a universal joint cross, a bearing cup, and a universal joint seal according to the invention, in assembled relationship.

Referring to FIG. 2, a cross 26 of the universal joint includes a body 28 having an annular shoulder 30 from which extends a trunnion 32. In this instance, the trunnion 32 also has a narrow annular offset 34 spaced below the shoulder 30. Needle bearings 36 can be located between the trunnion 32 and the cup 20. If desired, the cross 26 can have lubricating provisions for the needle bearings, as is known in the art.

The bearing cup 20 has a bottom wall 38 and a thin cylindrical side wall 40 which extends upwardly near the cross body shoulder 30 when the trunnion 32 is fully inserted in the cup 20.

A resilient annular seal 42 is accordance with the invention is provided to effectively seal off the annualr space between the bearing cup 20 and the trunnion 32. The seal 42 is contained between the trunnion 32 and an inner cylindrical surface 44 of the cup 20 and between the annular shoulder 30 and the upper ends of the needle bearings 36. The seal 42 comprises a resilient sealing member 46 preferably made of rubber with a typical hardness of eighty to ninety-five durometers. It does not require metal inserts or metal backing as some seals heretofore employed, such seals being relatively expensive.

Referring to FIG. 2, the sealing member 46 has an upper, inwardly-extending circular lip 48 which engages the trunnion 32 near the cross body 28. Similarly, the sealing member 46 has a lower, inwardly-extending circular lip 50 which engages the upper ends of the needle bearings 36. In between the ends of the sealing member 46 are two circular lips 52 and 54 which engage the trunnion along rather narrow, annular areas to provide two seals primarily intended to keep out contaminants and water. Further, between the ends of the sealing member 46 are three outwardly-extending circular lips 56, 58, and 60 which engage the inner cylindrical surface 44 of the bearing cup 20 along rather narrow, annular areas. These are also intended to keep out contaminants and water. The lips 50 and 60 are also intended to retain lubricant around the, needle bearings in the cups.

The lips 52 and 54 of the sealing member 46 are symmetrically staggered with respect to the lips 56, 58, and 60 to provide a better fit for the seal 42 between the trunnion and the cup. The first lips are directly opposite valleys between the second lips and the second lips are directly opposite valleys between the first lips.

The seal 42 is symmetrical about a central plane taken centrally through the seal. Specifically, the seal 42 is symmetrical with respect to a plane taken through the central outer lips 58. This enables the seal 42 to be inserted from either end into the cup 20 without requiring that it be sorted, either mechanically or by an operator, prior to assembly. Further, the seal cannot be incorrectly assembled with the cup.

Referring to FIG. 3, a modified cross 62 of a universal joint includes a body 64 having an annular, square shoulder 66 from which extends a trunnion 68 which is straight, without an offset, in this instance. A modified bearing cup 70 has a cylindrical side wall 72 which extends upwardly near the cross body. The cup 70 has an inwardly offset lip 74 extending upwardly further toward the cross 62.

In this instance, two, rows 76 and 78 of needle bearings are located between the cup and trunnion and have a washer 80 therebetween and an upper washer 82 above the upper row 78.

The same seal 42 is employed as in FIG. 2. However, the end lip 48 bears against a plastic shield 84 and specifically against a longer leg 86 thereof located between the seal and the shoulder 66 of the cross 62. The shield 84 also has a downwardly-extending lip 88 which protects against contaminants and water. The lip 88 of the shield 84 is located adjacent the offset lip 74 of the bearing cup 70 so as not to project beyond the outer surface of the bearing cup 70, particularly for purposes of assembly. The end lip 50 of the seal 42 bears against the upper washer 82 rather than against the ends of the needle bearings. As before, the seal 42 is symmetrical about a central plane so as to be reversible and inserted in the cup from either end of the sea.

Referring to FIG. 4, a modified cross 90 of a universal joint includes a body 92 having an annular, square shoulder 94 from which extends a trunnion 96. The trunnion 96 has a straight portion 98 and an upward, outwardly-flaring portion 100 near the shoulder 94. A modified bearing cup 102 has a cylindrical side wall 104 extending upwardly toward the universal joint cross 90 with an offset 106 therein. An upper end of the bearing cup 102 has on its inner surface, an outwardly-flaring portion 108. A single row 110 of needle bearings is located between the trunnion 96 and the bearing cup 102.

The same seal 42 is employed as in FIGS. 2 and 3. The end lip 48 bears against the shoulder 94 and the end lip 50 bears against the upper ends of the needle bearings 110. The inwardly-extending lip 52 bears against the flared portion 100 of the trunnion 96 and the outwardly-extending lips 58 and 60 bear against the flared portion 108 of the cup 102. In this instance, the lips 54 and 56 are spaced from the trunnion 96 and the cup 102, respectively.

Again, the seal 42 is symmetrical with respect to a central plane so as to be inserted from either end into the cup 102 without requiring that it be sorted and also assuring that it will not be assembled incorrectly.

Referring to FIG. 5, a slightly modified cross 112 includes a body 114 having an annular, square shoulder 116 from which extends a trunnion 118 having a straight portion 120 and an offset 122. An upper cylindrical portion 124 is located between the offset 122 and the shoulder 116. A slightly modified bearing cup 126 has a cylindrical side wall 128 which extends upwardly near the cross body. The bearing cup 126 also has an inwardly offset lip 130 extending upwardly further toward the cross body 114. In this instance, the bearing cup 126 also has an inner shoulder 132 facing toward the open end of the cup.

A resilient annular seal 134, in accordance with the invention, is provided to effectively seal off the annular space between the bearing cup and the trunnion. The seal 134 is contained between the cylindrical portion 124 of the trunnion 118 and an inner cylindrical surface 136 of the cup 126. It is also contained between the inner shoulder 132 of the bearing cup 126 and the plastic shield 84 which is shown and discussed in FIG. 3.

The seal 134 comprises a resilient sealing member 138 having an upper, inwardly-extending circular lip 140 which engages the cylindrical portion 124 of the trunnion and also the inner end of the plastic shield 84. Similarly, the sealing member 138 has a lower, inwardly-extending circular lip 142 which engages the washer 82 on top of the upper row of needle bearings 78 which are also shown in FIG. 3. Between the ends of the sealing member 138 is a central lip 144 which engages the portion 124 of the trunnion along a rather narrow, annular area. A sealing member 138 also includes two outwardly-extending lips 146 and 148 which engage the inner cylindrical surface 136 of the cup 126 along rather narrow, annular areas. In addition, the sealing member 138 has a thin lip 150 at its upper end which engages the plastic shield 84 and a thin lip 152 at its lower end which engages the inner shoulder 132 of the cup 126.

The seal 134 is intended to keep out contaminants and water and also to retain lubricant around the needle bearings and the cup.

The lips 146 and 148 are staggered with respect to the lip 138 to provide a better fit for the seal. The lip 144 is directly opposite a valley between the lips 146 and 148.

While the seal 134 is a substantially different shape than the seal 42, again it is symmetrical with respect to a central plane extending through the inner lip 144 so that the seal does not need to be sorted and cannot be inserted incorrectly.

Figure 6:
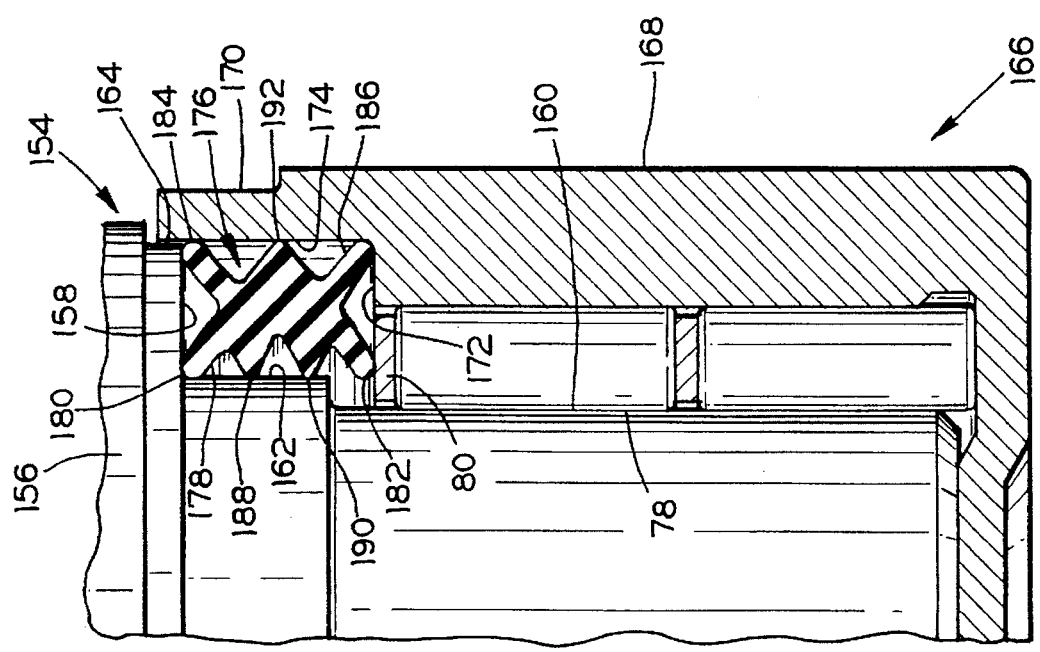
FIG. 6 is a fragmentary view similar to FIG. 3 but showing a modified cup design, a modified trunnion, and a modified seal.

Referring to FIG. 6, a modified cross 154 of a universal joint includes a body 156 having an annular, square shoulder 158 and a straight portion 160. A cylindrical portion 162 is located between the straight portion 160 and the shoulder 158 and a thinner, larger diameter cylindrical portion 164 is located between the shoulder 158 and the body 156 of the cross. A modified bearing cup 166 has a cylindrical outer side wall 168 and an extending lip 170 which extends upwardly near the thinner cylindrical portion 164 of the cross. The bearing cup 166 also has an inner shoulder 172 and an upper, inwardly-facing cylindrical surface 174 thereabove.

A modified resilient seal 176 comprises a resilient sealing member 178 having an inwardly- and upwardly-extending lip 180 at its upper end and a downwardly-extending inner lip 182 at its lower end. The upper lip engages the cross at the juncture of the cylindrical portion 162 and the shoulder 158 while the lower lip 182 contacts the washer 80 on top of the needle bearings 78 as shown in FIGS. 4 and 5. The resilient sealing member 178 also has an outwardly- and upwardly-extending lip 184 at its upper end which engages the shoulder 158 and the inner cylindrical surface 174 of the bearing cup 166.

The sealing member 178 also has a lip 186 at its lower end which extends downwardly and outwardly and engages the bearing up at the juncture of the cylindrical surface 174 and the inner shoulder 172.

Between the ends of the resilient sealing member 178 are two inwardly-extending lips 188 and 190 which engage the cylindrical portion 162 of the cross. Between the ends of the member also is an outwardly-extending lip 192 which is staggered with respect to the lips 188 and 190, being directly across from a valley between those lips. The lip 192 engages the cylindrical portion 174 of the bearing cup 166. The seal 176 along with the close fit between the cup lip 170 and the thin cylindrical portion 164 of the cross keep out contaminants and water and retain lubricant in the bearing cup around the bearings. Because of the close fit between the cup lip 170 and the cylindrical portion 164 of the cross, it may be necessary to provide a lubricating system as shown in Mazziotti and Sowers U.S. patent application Ser. No. 08/391,594, filed Feb. 21, 1995, to provide lubricant for the bearings.

The seal 176 is symmetrical with respect to a central plane extending through the outwardly-extending lip 192 so that it can be inserted in the bearing cup from either end of the seal. Again, this eliminates sorting and prevents incorrect assembly.

Figure 7:
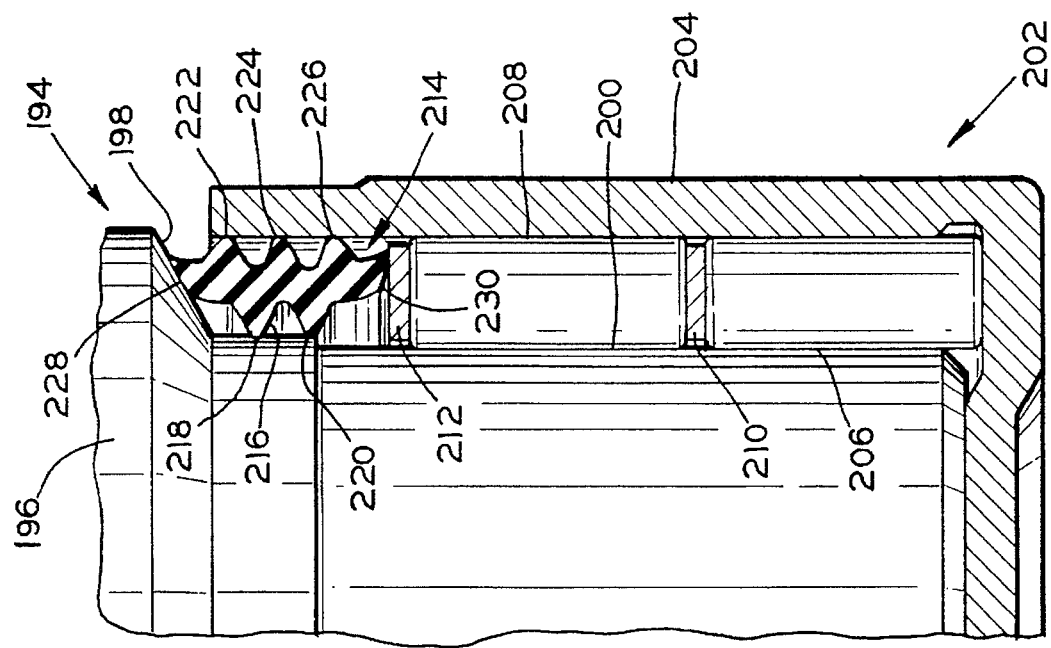
FIG. 7 is a fragmentary view similar to FIG. 3 but showing a modified cup design, a modified trunnion, and a modified reversible seal.

Referring to FIG. 7, a modified cross 194 includes a body 196 having an annular, slanted shoulder 198 from which extends a trunnion 200. A bearing cup 202 is similar to the bearing cup 20 and has a cylindrical side wall 204 extending upwardly near the cross body 196.

Two rows 206 and 208 of needle bearings are located between the trunnion 200 and the cup wall 204. The two rows are separated by a washer 210, with a washer 212 located on top of the row 208 of bearings.

A reversible, resilient seal 214, in accordance with the invention, is provided to effectively seal off the annular space between the bearing cup and the trunnion. The seal is contained between the trunnion 200 and the cylindrical wall 206 of the cup 202. It is also contained between the annular, slanted shoulder 198 of the cross 194 and the washer 212.

The seal 214 comprises a resilient sealing member 216 having inwardly-extending circular lips 218 and 220 which engage the trunnion 200. Similarly, the sealing member 216 has three outwardly-extending lips 222, 224, and 226 which engage the cylindrical wall 204 of the cup 202. The resilient sealing member 216 also has an upwardly-extending, slanted lip 228 at its upper end which engages the annular, slanted shoulder 198 and a lower slanted lip 230.

Further, the slanted lips 228 and 230 are identical so that the seal can be inserted from either end. Otherwise, the lower lip 230 could be square in so far as its functionality is concerned, namely to press downwardly on the washers and bearings. Again, the seal 214 is symmetrical about a central plane to eliminate sorting and to eliminate incorrect assembly.

As will be seen from above, the sealing member according to the invention, while of different shapes, has at least one upwardly- and inwardly-extending lip at its upper end and at least one downwardly- and inwardly-extending lip at its lower end. Further, the sealing member has at least one inwardly-extending lip engaging the trunnion of the cross and at least one outwardly-extending lip engaging an inner surface of the bearing cup. In all instances, the sealing members are symmetrical with respect to a central plane so that they can be inserted in the cups from either of their ends.

All of the seals can be used with either single or double rows of needle bearings with flat or rounded tops. They can also be used with washers above the top ends of the needle bearings and with or without washers between two rows of needle bearings when two rows are employed.

All of the seals can be made of similar material as discussed in connection with the seal 42 of FIG. 2.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In combination, a universal joint seal, a cross, and a bearing cup, said cross having a body and a trunnion, said cross also having an annular shoulder at the juncture of said body and said trunnion, said bearing cup having a cylindrical inner surface, said trunnion being received in said bearing cup, a plurality of needle bearings in said bearing cup between the inner surface thereof and said trunnion, said universal joint seal comprising a reversible, resilient sealing member having at least two first spaced lips engaging said trunnion adjacent said annular shoulder, said reversible, resilient sealing member also having at least two second spaced lips engaging said cylindrical inner surface, said second spaced lips being staggered with respect to said first spaced lips, said reversible, resilient sealing member having a first end lip on a first annular end exerting pressure on said plurality of needle bearings, and said reversible, resilient sealing member having a second end lip on a second annular end extending toward said annular shoulder of said cross, said first end lip and said second end lip being equal in size and shape, said reversible, resilient sealing member being symmetrical with respect to a plane taken centrally therethrough whereby said reversible, resilient sealing member is adapted to be inserted in said bearing cup with either annular end extending into the bearing cup.

* * * * *